(12) United States Patent
Carone

(10) Patent No.: US 10,907,017 B2
(45) Date of Patent: Feb. 2, 2021

(54) ADHESIVE COMPOUND FOR REINFORCING PLIES FOR TYRES

(71) Applicant: BRIDGESTONE CORPORATION, Tokyo (JP)

(72) Inventor: Enrico Carone, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 100 days.

(21) Appl. No.: 16/099,512

(22) PCT Filed: May 11, 2017

(86) PCT No.: PCT/EP2017/061400
§ 371 (c)(1),
(2) Date: Nov. 7, 2018

(87) PCT Pub. No.: WO2017/194710
PCT Pub. Date: Nov. 16, 2017

(65) Prior Publication Data
US 2019/0144617 A1    May 16, 2019

(30) Foreign Application Priority Data

May 12, 2016 (IT) .................. 102016000049029

(51) Int. Cl.

| | |
|---|---|
| *C08J 5/04* | (2006.01) |
| *C09J 109/08* | (2006.01) |
| *B60C 1/00* | (2006.01) |
| *C08K 5/21* | (2006.01) |
| *C08L 97/00* | (2006.01) |
| *C08L 61/14* | (2006.01) |
| *C08K 5/17* | (2006.01) |

(52) U.S. Cl.
CPC .............. *C08J 5/046* (2013.01); *B60C 1/00* (2013.01); *B60C 1/0041* (2013.01); *C08K 5/17* (2013.01); *C08K 5/21* (2013.01); *C08L 61/14* (2013.01); *C08L 97/005* (2013.01); *C09J 109/08* (2013.01); *C08J 2309/08* (2013.01); *C08J 2461/12* (2013.01); *C08J 2467/00* (2013.01); *C08J 2497/00* (2013.01)

(58) Field of Classification Search
CPC .... C08J 5/04; C08J 109/08; B60C 1/00; C09J 109/08
USPC .......................................................... 524/74
See application file for complete search history.

(56) References Cited

U.S. PATENT DOCUMENTS 3,725,326 A * 4/1973 Solomon ............... C08F 210/00
524/501

FOREIGN PATENT DOCUMENTS

| | | |
|---|---|---|
| CA | 754106 A | 3/1967 |
| GB | 1055988 A | 1/1967 |
| JP | 2001-234143 A | 8/2001 |
| JP | 2001234143 * | 8/2001 |
| WO | 2014/091429 A1 | 6/2014 |

OTHER PUBLICATIONS

International Search Report for PCT/EP2017/061400 dated Jul. 3, 2017 [PCT/ISA/210].
Written Opinion for PCT/EP2017/061400 dated Jul. 3, 2017 [PCT/ISA/237].

* cited by examiner

*Primary Examiner* — Deve V Hall
(74) *Attorney, Agent, or Firm* — Sughrue Mion, PLLC

(57) ABSTRACT

An adhesive composition that can be applied to reinforcing plies of textile material for tyres and comprising (a) an elastomeric rubber latex, (b) a precondensed resin composed of resorcinol and formaldehyde and comprising protected isocyanate groups, (c) lignin and (d) a compound chosen from urea and thiourea.

6 Claims, No Drawings

ADHESIVE COMPOUND FOR REINFORCING PLIES FOR TYRES

CROSS REFERENCE TO RELATED APPLICATIONS

This application is a National Stage of International Application No. PCT/EP2017/061400, filed on May 11, 2017, which claims priority from Italian Patent Application No. 102016000049029, filed on May 12, 2016.

The present invention relates to an adhesive compound for reinforcing plies for tyres.

In the production of tyres, in order to ensure required resistance standards, reinforcing plies are utilized which are made from a textile material (such as e.g. nylon, rayon, polyester, aramid).

As known to a person skilled in the art, textile materials are commonly utilized as a reinforcement material within the carcass which has the function of defining the geometry of the tyre, supporting the load and transferring the vehicle stresses to the ground, ensuring the endurance strength to the stressed areas and preventing tyre growth at high speed.

The reinforcing plies are coated with a layer of rubber of about 1 mm, which hereinafter within this document will be indicated using the English term "ply skim."

Commonly the plies are treated with an adhesive composition in order to promote the adhesion thereof to the ply skim. As is obvious to a person skilled in the art, inadequate adhesion between the ply skim and the ply will necessarily result in a short lifespan for the tyre.

The adhesive compositions that are generally utilized are basic pH aqueous suspensions comprising a combination of resorcinol and formaldehyde in a molar ratio of 1:2.

For safety reasons there is a need to drastically reduce the use of formaldehyde in industrial processings.

The utilization of a precondensed resin composed of resorcinol and formaldehyde with isocyanate protected groups was introduced long ago. The ratio of resorcinol and formaldehyde within the precondensed resin is 1:1, which necessarily implies that, in order to implement the aforementioned adhesive composition other than the precondensed resin, an additional quantity of free formaldehyde is also added. From the aforementioned, it is clear that the introduction of precondensed resin cannot solve the problem associated with the utilization of formaldehyde.

The need was therefore felt to implement an adhesive composition to be applied to plies for tyres that do not include the utilization of free formaldehyde without compromising the adhesive properties thereof.

The object of the present invention is an adhesive composition which is suited to be applied to reinforcing plies of textile material for tyres; said adhesive composition being a single basic aqueous solution comprising (a) an elastomeric rubber latex and (b) a precondensed resin composed of resorcinol and formaldehyde and comprising protected isocyanate groups; said adhesive composition being characterized in that said single aqueous solution further comprises (c) lignin and (d) a compound chosen from between urea and thiourea.

The basic environment of aqueous solution removes the protection from the precondensed resin isocyanate groups. The isocyanate groups react with the urea or with the thiourea there present. As is known, the reaction between the urea or thiourea and the isocyanate groups takes place only wherein the nitrogen atoms of the urea and thiourea are not replaced. In fact, the presence of substituents on the nitrogen atoms would prevent them from reacting such as to produce long-chain structures.

Preferably, said elastomeric rubber latex comprises a styrene-butadiene-vinylpyridine latex or a latex from a mixture of styrene-butadiene-vinylpyridine and styrene-butadiene.

Preferably, the lignin is sulfonated lignin.

Preferably, said adhesive composition comprises from 5 to 25 phr of said precondensed resin, from 1 to 10 phr of lignin and from 1 to 10 phr of the compound chosen between urea and thiourea.

A further object of the present invention is a reinforcing ply of textile material for tyres soaked in the adhesive composition according to the present invention.

A still further object of the present invention is a tyre comprising a reinforcing ply of textile material for tyres soaked in the adhesive composition according to the present invention.

For a better understanding of the invention, the following examples are for illustrative and non-limiting purposes.

EXAMPLES

Two adhesive compositions for reinforcing plies were made. The first is a comparison adhesive composition (Comp.), wherein free formaldehyde was utilized, and the second is an adhesive composition according to the invention (Inv.), wherein free formaldehyde was not utilized, but rather a combination of urea and lignin.

In Table I the compositions by weight % of the two adhesive compositions are reported.

TABLE I

|  | Comp. | Inv. |
| --- | --- | --- |
| Latex | 100 | 100 |
| Resorcinol | 5.5 | — |
| Free formaldehyde | 12 | — |
| Ammonia | 20 | 20 |
| Condensed resin | — | 19 |
| Urea | — | 2 |
| Lignin | — | 3 |

The latex utilized in adhesive compositions is a styrene-butadiene-vinylpyridine latex.

The condensed resin utilized is indicated with the abbreviation "I-168-L" and marketed by the company INDSPEC CHEMICAL.

Hereinafter, by way of example, a procedure is reported for the preparation of the two compositions Comparison (Comp.) Adhesive Composition Preparation Procedure The resorcinol is dissolved in water at the desired concentration. The formaldehyde is then added in the ratios reported in Table I, and the resulting solution is left to react for a period of time from 5 minutes to 30 minutes. At this point the ammonia is slowly added and left to react for period of time ranging from 5 minutes to 1 h. Finally, the latex is added and left to mature for a period of time from 1 h to 72 h.

Adhesive Composition of the Invention (Inv.) Preparation Procedure

The condensed resin is dissolved in water, the pH thereof being previously brought up to a value ≥9 by adding an appropriate amount of ammonia.

The urea is then added and the pH of the solution is brought up to a value ≥10 by further addition of ammonia.

At this point the lignin and the latex are added.

The two adhesive compositions described above were applied using the same procedure to polyester cords (1670/2 390×390) for the preparation, respectively, of a composite made utilizing the comparison adhesive composition and of a composite made utilizing the adhesive composition of the invention.

By means of a calendering operation, the cords treated with the adhesive compositions were embedded between two layers of ply skim.

In Table II the composition of the ply skim compound utilized to embed in the same manner both the cords treated with the comparison adhesive composition Comp. and the cords treated with the adhesive composition of the invention Inv. is reported.

TABLE II

| Natural rubber | 100 |
| Carbon black | 40 |
| Sulfur | 7 |
| Accelerant | 1.5 |

The natural rubber is made up of a polymer base composed of natural origin cis-1,4-polyisoprene.

The accelerant utilized is N-tert-butyl-2-benzothiazyl-sulfenamide (TBBS).

Below, a procedure for the preparation of ply skim compounds is reported.

($1^{nd}$ Mixing Step)

Before the start of the mixing, a mixer with tangential rotors (commonly called Banbury) and an internal volume of between 230 and 270 liters was loaded with the polymer base and the reinforcing filler, reaching a fill factor of 66-72%.

The mixer was operated at a speed of 40-60 rpm, and the mixture thus formed was discharged once a temperature of 140-160° C. had been reached.

($2^{nd}$ Mixing Step)

The vulcanization system was added to the mixture obtained from the previous step, reaching a fill factor of 63-67%. The mixer was operated at a speed of 20-40 rpm, and the mixture thus formed was discharged once a temperature of 100-110° C. had been reached.

The composites obtained as a result of the calendering operation, once vulcanized, were subjected to adhesion tests.

The adhesion tests were performed by separating the two parts of the cord-rubber composite by means of the application of a load in order to then estimate the percentage of ply coated by the rubber.

In particular, the adhesion tests were conducted both on composites obtained after varying periods of vulcanization and on composites subjected to varying periods of aging.

In this way it was possible to verify whether the adhesive composition of the invention would be able to ensure the same adhesive strength as the comparison composition even in view of varying periods of vulcanization and varying periods of aging.

Specifically, the vulcanization periods considered were respectively 10 minutes, 50 minutes, 110 minutes, 170 minutes; whilst the aging periods considered were respectively 8 hours, 16 hours and 24 hours.

The aging procedure requires that the composites be kept in an oven at 125° C. in accordance with the ISO 188 standard for a variable period of time as indicated in Table III.

In Table III the forces (Newton/cord) required in order to extract the cords from the rubber as a function of the periods of vulcanization are reported; in Table IV the forces (Newton/cord) required in order to extract the cords from the rubber as a function of the periods of aging to which the composites were subjected are reported.

TABLE III

|  | Comp. | Inv. |
| --- | --- | --- |
| 10 min. | 20.0 | 19.8 |
| 50 min. | 16.8 | 15.1 |
| 110 min. | 13.3 | 12.1 |
| 170 min. | 9.0 | 8.8 |

TABLE IV

|  | Comp. | Inv. |
| --- | --- | --- |
| 0 hours (no aging) | 20.0 | 19.8 |
| 8 hours | 16.4 | 17.3 |
| 16 hours | 14.5 | 14.4 |
| 24 hours | 13.7 | 12.9 |

From the data reported in Tables III and IV it is clear that the presence of lignin, combined with the structure formed by the reaction between the resorcinol and formaldehyde combined resin with the urea or thiourea, manages to overcome the need to utilize free formaldehyde. In fact, the only formaldehyde present within the composition of this invention is not in the free state but rather embedded within the precondensed resin.

In summary, the adhesive compound, object of the present invention, is capable of ensuring the adhesion levels of the comparison compound without, however, having to utilize free formaldehyde.

In this way the adhesive compound of the present invention has the great advantage of being able to avoid the use of free formaldehyde, with all of the benefits that this entails in terms of safety, without compromising performance in terms of adhesion.

The invention claimed is:

1. An adhesive composition suited to be applied to reinforcing plies of textile material for tyres; said adhesive composition being a single basic aqueous solution comprising (a) a latex of an elastomeric rubber and (b) a precondensed resin composed of resorcinol and formaldehyde and comprising protected isocyanate groups; said adhesive composition being characterized in that said single aqueous solution further comprises (c) lignin and (d) thiourea.

2. Adhesive composition according to claim 1, characterized in that said elastomeric rubber latex comprises a styrene-butadiene-vinylpyridine latex or a latex from a mixture of styrene-butadiene-vinylpyridine and styrene-butadiene.

3. Adhesive composition according to claim 1, characterized in that the lignin is sulfonated lignin.

4. Adhesive composition according to claim 1, characterized in that it comprises from 5 to 25 phr of said precondensed resin, from 1 to 10 phr of lignin and from 1 to 10 phr of the compound chosen from urea and thiourea.

5. Reinforcing ply of textile material for tyres soaked in the adhesive composition according to claim 1.

6. Tyre comprising a reinforcing ply of textile material according to claim 5.

* * * * *